Patented Sept. 21, 1943

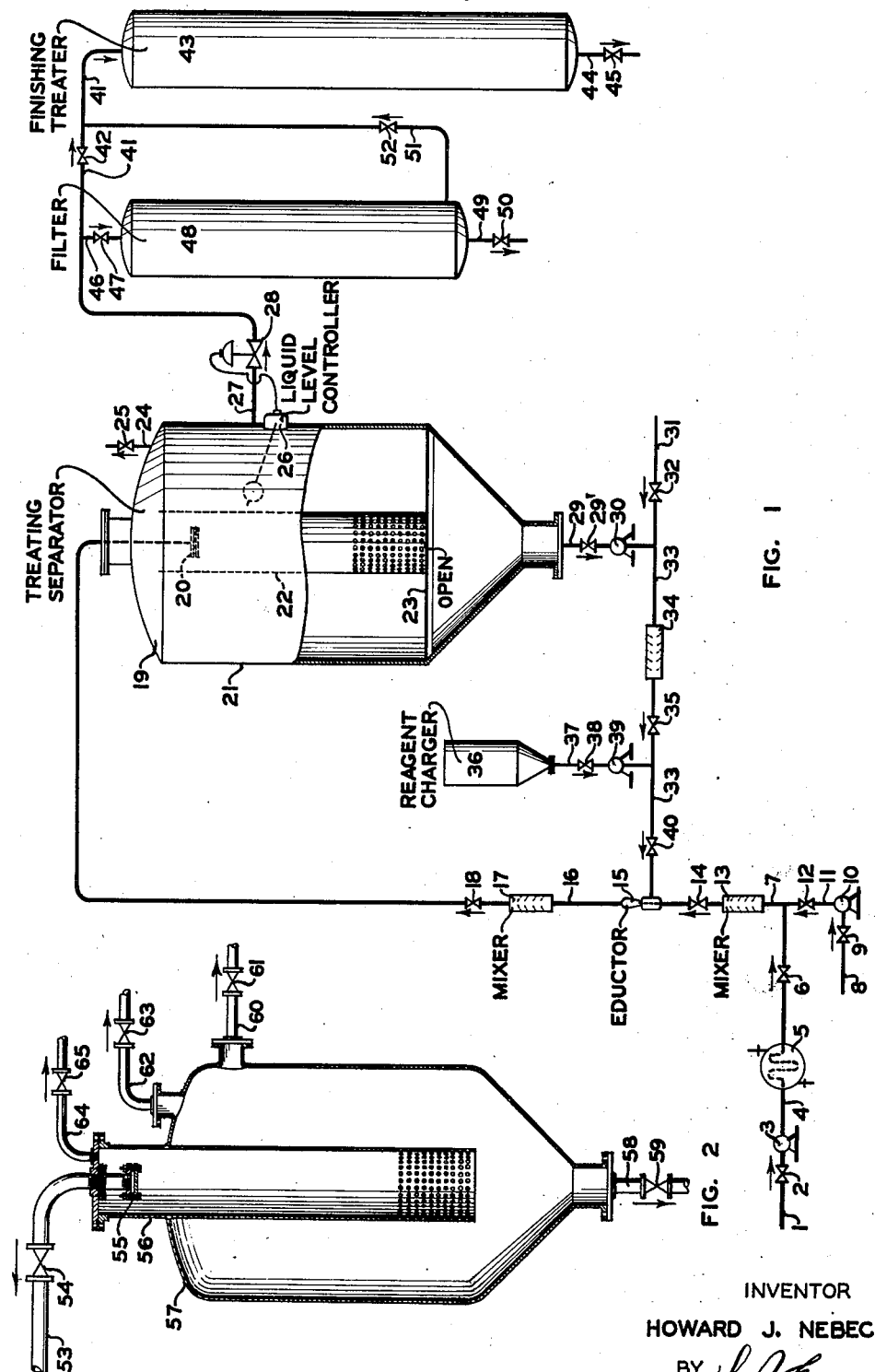

2,329,930

UNITED STATES PATENT OFFICE 2,329,930

PROCESS FOR SWEETENING HYDRO-CARBON DISTILLATES

Howard J. Nebeck, Chicago, Ill., assignor to Universal Oil Products Company, Chicago, Ill., a corporation of Delaware Application May 19, 1941, Serial No. 394,116

3 Claims. (Cl. 196—29)

This invention relates to a process for treating hydrocarbon distillates. More particularly, it relates to a process for sweetening relatively light hydrocarbon oils, such as gasoline, kerosene etc., with a copper containing sweetening reagent.

Various processes have been suggested for sweetening hydrocarbon oils by means of copper containing sweetening reagent. The reagent has been used in the form of solutions as well as solids. One object of the present invention is to improve present methods of sweetening with solid copper sweetening reagents. Another object is to provide an apparatus suitable for use in such a process.

In one specific embodiment the present invention comprises a process for conducting reactions such as sweetening hydrocarbon distillates, which comprises contacting a mixture of a liquid, a gas, and a finely divided reagent in a treating zone of restricted cross-section, discharging the mixture into a primary zone of enlarged cross-section maintained within a second zone of enlarged cross-section whereby the said gas is disengaged above the liquid level maintained in the enlarged zone, discharging the substantially gas-free mixture from said primary zone into said second zone, withdrawing separated gas, separating and recovering treated product from said second zone, and returning the finely divided treating agent to the first mentioned treating zone. In a further alternative the used reagent may be continuously regenerated.

In a more specific embodiment the invention comprises a copper sweetening process which comprises passing a mixture of sour hydrocarbon oil, oxygen containing gas, and finely divided copper sweetening reagent through a sweetening zone of restricted cross-section, discharging the mixture into a zone of enlarged cross-section maintained within a second enlarged zone, separating and removing residual gas, discharging the substantially gas-free mixture into said second zone, separating and recovering treated oil therefrom, concentrating the used treating agent as a slurry in the remaining relatively minor portion of the treated oil, continuously withdrawing the slurry and supplying it to the first mentioned sweetening zone.

A further embodiment of the invention comprises an apparatus for continuously conducting reactions such as copper sweetening of liquid hydrocarbons in the presence of a gas and a suspended finely divided agent, and thereafter separating said gas and said agent from the product, recovering the product and the used agent, recycling the used agent, said apparatus comprising a primary contacting zone of restricted cross-section intercommunicating with a second zone of enlarged cross-section, said second zone comprising an exterior shell having a cone shaped bottom, an internal annular vertical baffle terminally communicating with the interior of said shell, a communicating inlet from said primary contacting zone discharging within the vertical baffle, means for maintaining a liquid level in said second zone at a point intermediate in the vertical length of said baffle and below the discharge of the inlet from the primary contacting zone, means for withdrawing treated liquid, means for releasing the separated gas, means for withdrawing used reagent as a slurry in part of the liquid and returning this slurry to said primary contacting zone.

The invention is further understood by reference to the accompanying drawing which is in part diagrammatic and should not be construed as limiting the invention to the exact conditions shown therein.

Figure 1 illustrates an arrangement of apparatus for carrying out one embodiment of the entire process. It also shows one form which the treater-separator may take.

Figure 2 illustrates another form of treater-separator which may be used in place of treater 19 of Figure 1. These vessels are not necessarily exactly equivalent in their effectiveness but each has advantages. The choice of the proper vessel will depend, to a certain extent, upon the treating conditions of pressure particularly which may be employed.

The hydrocarbon oil which may be treated is of a distillate character and comprises cracked and straight-run gasoline, naphtha, kerosene and other light hydrocarbon oils which contain mercaptans and require sweetening in order to put them in marketable condition.

Referring to Figure 1 of the drawing, the charging stock is introduced through line 1, containing valve 2, and is pumped by pump 3 through line 4, heat exchanger 5, and valve 6, to line 7. It should be treated to remove hydrogen sulfide prior to this treatment. This may be done by various methods, but is usually accomplished by treatment with a sodium hydroxide or other alkali- or alkaline-earth metal carbonates or hydroxides to prevent deterioration of the copper sweetening agent. Certain other acidic materials may also be removed, including phenols.

In certain instances, it is desirable to remove other components present in traces which react harmfully with the agent. This may be done by treating the distillate with a dilute solution of a mineral acid, particularly hydrochloric or sulfuric acids.

The oil temperature may be raised to a point slightly above that at which it is drawn from storage in order that small amounts of water which form during the subsequent sweetening action may be dissolved in the gasoline and thus removed from the system without accumulating in the copper sweetening reagent. If the moisture is allowed to accumulate the reagent may become caked and have to be replaced.

Air is introduced through line 8, valve 9, and compressor 10 to line 11 and valve 12, joining with the gasoline in line 7 and passing into any suitable type of mixer 13. The mixture passes through valve 14 to eductor 15 by means of which the copper sweetening agent is introduced, as will be described hereinafter. The copper sweetening reagent consists of a minor amount of fresh sweetening agent together with a major portion of used sweetening agent which is being recirculated. The reagent sweetens the distillate and undergoes simultaneous regeneration during passage of the mixture through line 16, mixer 17, and valve 18. The gasoline is introduced into the treater-separator 19 through spray nozzle 20.

The treater-separator or reactor consists of a shell 21, which is suitably equipped with a cone bottom. Centrally located in the shell is a pipe or annular baffle 22 of enlarged cross-section, which communicates terminally with the interior of shell 21. As illustrated in Figure 1 the baffle may be open at both ends. In another suitable form the baffle may open into the shell at only the lower end. In any event the pipe or baffle should discharge into the interior of the shell at a point well below the point at which clear treated gasoline is removed. It may be supported, for example, by an angle iron support 23. Any other suitable method of supporting the baffle may be used. This baffle is of sufficient size to permit a separation of air from the solid and liquid constituents of the reacting mixture in the upper region thereof. The shell is also equipped with vent line 24 containing valve 25 from which the released residual air passes to the atmosphere. The treating vessel is equipped with a liquid level controller 26 and draw-off line 27, containing valve 28, which is controlled by the liquid level controller 26. The liquid level is preferably maintained at a point substantially below that at which spray nozzle 20 discharges into the annular space but substantially above the bottom of pipe 22. This permits a separation of gasoline and solid treating agent from the air in the upper portion of pipe 22.

This feature is of considerable importance since the reactor serves both as a treating chamber and a separating chamber for the gasoline and the treating agent. If the air is allowed to separate below the level of the gasoline, there is a tendency to maintain the treating agent in suspension and thus defeat the purpose of this apparatus. Moreover, it is desirable to separate the gasoline from treating agent and residual air as quickly as possible. This is especially true in the case of cracked gasoline, since the copper reagent tends to catalyze oxidation reactions. The apparatus of this invention permits such rapid separation. The baffle permits the gas to separate near the top above the liquid level while the solid reagent settles rapidly by gravity during passage of the mixture down through the pipe 22, some treating of hydrocarbons occurring during this time.

The liquid inlet should be sufficiently below the top opening of the baffle 22 so that little or no entrained gasoline or reagent is carried over the top into the surrounding region. This can be further controlled by regulating the diameter of baffle 22. The diameter should not be so great as to permit the reagent to separate too quickly since some treating may occur in this region. However, the velocity should be reduced below a point at which the powder remains in stable suspension in the oil. Baffle 22 opens into the cone bottom of shell 21. Also to facilitate separation of the gasoline and solid reagent, the lower part of baffle 22 may be perforated for a portion of its length, beginning substantially below the liquid level and the point of drawoff of treated product. This permits flow of gasoline outward as well as downward into the shell. The reagent concentrates in the bottom of the cone and is withdrawn as a slurry in a portion of the treated gasoline through line 29, valve 29', and pump 30. Air is introduced through line 31 containing valve 32. The mixture of air and gasoline passes through line 33 which may contain mixer 34 and valve 35. Partial regeneration of the sweetening agent occurs at this point. A minor amount of fresh sweetening agent may be added from the reagent charger 36 through line 37 containing valve 38 and pump 39. The mixture passes through line 33 and valve 40 to eductor 15 and, as previously described, is thus used for sweetening additional quantities of distillate. If the eductor is not used pump 30 may be employed. In this case a slightly elevated pressure may be maintained on line 33 in order to improve the efficiency of regeneration. The recirculated slurry contains as large an amount of sweetening agent and as little oil as possible and still permit the mixture to flow readily.

The sweetened oil passes through line 27 and valve 28 through line 41, containing valve 42, to finishing treater 43, wherein dissolved copper compounds are removed from the distillate. The treated finished distillate is withdrawn through line 44 containing valve 45 to storage. In the case of cracked gasolines, gum inhibitors, or other addition agents for improving the storage stability or antiknock properties of the gasoline may be incorporated at this point.

As an alternative, valve 42 may be closed and the gasoline passed through line 46 containing valve 47 through filter 48 which may contain a filtering material such as fuller's earth, bentonite, finely divided sand, etc., for removing any sweetening agent which may have been suspended in the oil and not sufficiently separated in the primary treater, 19. The quantity of such suspended reagent, while not very large, may appreciably decrease the life of the secondary treating agent contained in treater 43 and is thus best removed (more or less mechanically) in filter 48. Filter 48 contains drawoff line 49 and valve 50 for draining. The filtered gasoline passes through line 51, containing valve 52, to line 41 and is thus passed to the secondary treater.

When treating some straight-run products, such as straight-run gasoline or natural gasoline, the finishing treater 43 can be dispensed with, but it is desirable to remove suspended copper reagent in filter 48 and in this case valve 52 is closed and the gasoline is recovered through line 49.

Figure 2 is a variation of the treater-separator which may be used in place of vessel 19 shown in Figure 1.

Referring to Figure 2 the gasoline may be introduced through line 53, containing valve 54, through spray 55. This may be any form of spray in order to obtain a relatively even distribution of the liquid throughout the enlarged zone or annular baffle 56. Baffle 56 extends well into shell 57. The annular baffle 56 may be supported by tie-rods or other supports, not shown, within shell 57. The baffle 56 discharges into shell 57 at a point near the cone-shaped bottom. In order to assist in the separation of liquid and solid material, the lower portion of the annular baffle may be perforated as illustrated. The solid treating agent settles to the bottom of shell 57 and may be withdrawn through line 58, containing valve 59. Subsequent treatment is similar to that described in the operation used in Figure 1. The treated product may be removed through line 60, containing valve 61. When operating under certain conditions a small amount of gas may remain dissolved in the liquid and this may separate within the shell and can be withdrawn therefrom through line 62, containing valve 63. The gas which separated upon introduction of the reactants into the annular baffle 56 may be withdrawn through line 64, containing valve 65. The location of spray 55 is important and should be maintained at a point relatively near the top of the annular baffle but at a sufficient distance from the top so that little or no entrained liquid or solid treating agent is carried out of the system with the separated gas. Moreover, the outlet should not extend substantially below the surface of the liquid maintained in the treating zone. The purpose of this is to prevent excessive stirring of the liquid-solid suspension which hinders settling and separation of the solid.

The primary copper treating agent may comprise any copper-containing mixture which is in a finely divided form and which may be temporarily suspended in the distillate undergoing treatment. For example, a finely divided material such as fuller's earth, pumice, bentonite, kaolin, diatomaceous earth and the like, may be impregnated with a suitable copper salt such as copper chloride, or with a mixture of copper sulfate and ammonia chloride or sodium chloride. The support should be substantially unreactive with copper salts and should be of a nature such that it does not coagulate, thereby forming lumps or cakes which are difficult to handle or which plug up lines, pumps, etc. The reagent should contain relatively minor amounts of water, suitably about 10% or less, depending upon the character of the support and the amount of the active sweetening constituent thereon. The quantity of water is regulated to permit efficient sweetening but should not be enough to cause the reagent to cake. As previously mentioned, the temperature of the gasoline introduced into the system is maintained sufficiently high to dissolve out the water formed as a result of the sweetening action. This must be taken into consideration, since if the water were allowed to build up, it would eventually cause the reagent to dissolve out the copper salt. Since the water content of the incoming gasoline can be determined and since the quantity of water formed as a result of sweetening reaction can be calculated from the mercaptan content of the gasoline, the temperature at which the gasoline is introduced is readily determined. Ordinarily, this temperature is within the range of about 50–130° F. and preferably 70–100° F. It is also within the scope of this invention that the gasoline should be partially or completely dehydrated, prior to sweetening. Moreover, the moisture content of the air can be regulated also.

Any suitable secondary reagent may be used in the secondary treater. This reagent may be, and preferably is, in the form of a solid, although solutions of alkaline sulfides known to remove copper from gasoline may also be employed. Pumice or other relatively inert carrying may be coated or impregnated with a heavy metal sulfide, for example, zinc sulfide or iron sulfide, and used as a granular reagent through which the gasoline is percolated. The reagent may also be used as a powder with which the gasoline is contacted and later separated.

Numerous gasolines and other hydrocarbon distillates may be treated by the present method when employing, for example, a treating agent consisting of one part by weight of ammonia chloride, one part by weight of copper sulfate pentahydrate and two parts of powdered pumice. All of these reagents may be mixed mechanically and then ground to pass a 200-mesh screen. The quantity of air employed may be of the order of 5–8 cu. ft./bbl. of gasoline treated. The rate of recirculation of treating agent may vary over a wide range depending on the conditions of operation and the mercaptan content of the gasoline. Usually about 10% of treating agent by weight of gasoline may be present in line 16 wherein the major portion of the sweetening action occurs, although larger or smaller amounts may also be used.

The secondary reagent may consist of 20–60 mesh pumice coated with precipitated zinc sulfide. The primary sweetening operation may take place at 85° F. A pressure of approximately 10–100 lbs./sq. in. may be maintained on the system. The pressure maintained in line 16 may be somewhat higher than that maintained on primary treater 19. For example, the pressure in line 16 may be 50–75 lbs./sq. in. and that in treater 19 may be 25–30 lbs. The benefit appears to be that a part of the oxygen dissolves in the gasoline while the sweetening reaction is taking place and improves the efficiency of the process. The pressure maintained on the secondary treating tower may be substantially less than that maintained on the primary tower.

I claim as my invention:

1. A process for sweetening hydrocarbon distillates which comprises commingling with the distillate an oxygen-containing gas and a finely divided copper-containing sweetening agent, subjecting the distillate to the sweetening action of said agent while passing the mixture in restricted stream flow, then discharging the stream into the upper portion of an enlarged vertical zone communicating at its lower end with a separating zone surrounding the first-mentioned zone, separating gas from the mixture in said vertical zone and removing the same from the upper portion of this zone, passing the remainder of the mixture downwardly through the vertical zone into the separating zone, settling out of the mixture in the separating zone a slurry of sweetening agent in a portion of the distillate and removing the slurry from the lower portion of the separating zone, recycling at least a portion of said slurry to the mixing step, and removing sweetened distillate from the separating zone at a point above that at which said vertical zone opens into the separating zone.

2. A process for sweetening hydrocarbon distillates which comprises commingling with the distillate on oxygen-containing gas and a finely divided copper-containing sweetening agent, subjecting the distillate to the sweetening action of said agent while passing the mixture in restricted stream flow, then discharging the stream into the upper portion of an enlarged vertical zone communicating at its lower end with a separating zone surrounding the first-mentioned zone, separating gas from the mixture in said vertical zone and removing the same from the upper portion of this zone, passing the remainder of the mixture downwardly through the vertical zone into the separating zone, maintaining in the separating zone a liquid level substantially above the point at which the vertical zone opens into the separating zone and below the point of discharge of said stream into the vertical zone, settling out of the mixture in the separating zone a slurry of sweetening agent in a portion of the distillate and removing the slurry from the lower portion of the separating zone, recycling at least a portion of said slurry to the mixing step, and removing sweetened distillate from the separating zone at a point above that at which said vertical zone opens into the separating zone.

3. The process as defined in claim 1 further characterized in that said sweetened distillate is removed from the separating zone at a point below the point of discharge of said stream into the vertical zone.

HOWARD J. NEBECK.